United States Patent [19]

Swatzina et al.

[11] Patent Number: 5,697,984
[45] Date of Patent: Dec. 16, 1997

[54] DYE PREPARATIONS WITH ETHYLENE OXIDE-CASTOR OIL REACTION PRODUCTS

[75] Inventors: Dieter Swatzina; Karin Heidrun Beck, both of Ludwigshafen; Christos Vamvakaris, Kallstadt; Juliane Krüsemann, Ludwigshafen, all of Germany

[73] Assignee: BASF Aktiengesellschaft, Ludwigshafen, Germany

[21] Appl. No.: 633,407

[22] Filed: Jun. 10, 1996

[30] Foreign Application Priority Data

Jun. 28, 1995 [DE] Germany ............ 195 23 464.2

[51] Int. Cl.$^6$ .................. D06P 1/10; D06P 1/613
[52] U.S. Cl. ................. 8/527; 8/552; 8/576; 8/506; 8/466; 8/685; 8/938; 8/907
[58] Field of Search .............. 8/525-528, 938, 8/506, 576, 552, 685, 907, 466; 106/22 E, 22 K, 27 R, 410-413, 496; 427/212

[56] References Cited

U.S. PATENT DOCUMENTS

| | | |
|---|---|---|
| 3,362,779 | 1/1968 | Lenz . |
| 4,332,587 | 6/1982 | Kressner et al. . |
| 4,722,738 | 2/1988 | Wilson . |

FOREIGN PATENT DOCUMENTS

| | | |
|---|---|---|
| 1081698 | 2/1994 | China . |
| 2 245 739 | 4/1975 | France . |
| 2 333 079 | 6/1977 | France . |
| 1-275678 | 11/1989 | Japan . |
| 2 037 819 | 7/1980 | United Kingdom . |

OTHER PUBLICATIONS

K. Lindner, "Tenside-Textilhilfsmittel-Waschrohstoffe," vol. 1, p. 902. Wissenschaftliche Verlagsgesellschaft MBH Stuttgart, 1964.

Abstract 110:233243 of CZ243976 Jan. 7, 1988 Novak et al.

Allémann et al, "PEG-coated Poly(lactic acid) ... " Jan. 12, 1995, J. Pharm. Pharmacol. 47(s) pp. 382-387.

Soncin et al, Cancer Lett (1995) 89(1) pp. 101-106 "Effect of the delivery system on the biodistribution of . . . ".

Polo et al, "The distribution of the tumor photosensitizers Zn(II)-phthalocyanine . . . ", Cancer Lett (1992) (66)(3) 217.23.

Database WPI, Derwent Publicatons, AN-88-290216, JP-A-63 213 583, Sep. 6, 1988.

*Primary Examiner*—Margaret Einsmann
*Attorney, Agent, or Firm*—Oblon, Spivak, McClelland, Maier & Neustadt, P.C.

[57] ABSTRACT

Dye preparations comprising one or more dyes with no water-solubilizing groups in the molecule from the class of the metal complex azo dyes or the metal phthalocyanines and reaction products between from 1 to 50 mol of ethylene oxide and 1 mol of castor oil are useful for coloring granular or pulverulent substrates and for preparing aqueous dye preparations useful in printing inks.

9 Claims, No Drawings

DYE PREPARATIONS WITH ETHYLENE OXIDE-CASTOR OIL REACTION PRODUCTS

The present invention relates to dye preparations comprising, in each case based on the weight of the preparation, from 0.01 to 50% by weight of one or more dyes which have no water-solubilizing groups in the molecule and come from the class of the metal complex azo dyes or the metal phthalocyanines, and from 50 to 99.99% by weight of a reaction product between from 1 to 50 mol of ethylene oxide and 1 mol of castor oil, their use for coloring aqueous or pulverulent substrates, aqueous dye preparations based on the abovementioned dye preparations and the use thereof in printing inks.

JP-A-275 678/1989 discloses colorant preparations comprising dyes or pigments and also, inter alia, from 0.5 to 5% by weight, based on the weight of the colorant preparation, of a reaction product between ethylene oxide and castor oil. These colorant preparations are used as ballpoint pen pastes.

It is an object of the present invention to provide novel solvent-free preparations of virtually water-insoluble dyes of the class of the metal complex azo dyes or metal phthalocyanines. The novel dye preparations shall be advantageously useful for coloring granular or pulverulent substrates. They shall also be simple to convert into aqueous preparations which in turn shall be useful in solvent-free printing inks, and the printing inks shall have good performance characteristics.

We have found that this object is achieved by the above-defined dye preparations.

All weight percentages recited in the respective dye preparations add up to 100% by weight, of course.

The dyes present in the dye preparations of this invention are free of water-solubilizing groups in the molecule. By water-solubilizing groups are meant in particular hydroxysulfonyl and carboxyl groups.

Such virtually water-insoluble dyes come from the class of the metal complex azo dyes or metal phthalocyanines, the metal complex azo dyes being preferred.

Metal complex azo dyes for the purposes of the present invention include not only symmetrical or asymmetrical 1:2 metal complex azo dyes but also 1:1 metal complex azo dyes. Examples of suitable complexing metals are iron, nickel, chromium and cobalt.

The use of chromium complex azo dyes, especially of symmetrical or asymmetrical 1:2 chromium complex azo dyes, as colorant in the dye preparations of this invention is preferred.

Examples of suitable metal phthalocyanines are copper phthalocyanines and nickel phthalocyanines. The use of copper phthalocyanines is preferred.

The dyes mentioned are generally known and commercially available. The Colour Index classifies them as C.I. Solvent Dyes.

Examples of suitable dyes are C.I. Solvent Yellow 19 (13900:1), C.I. Solvent Yellow 25, C.I. Solvent Yellow 32 (48045), C.I. Solvent Yellow 79, C.I. Solvent Yellow 81, C.I. Solvent Yellow 82, C.I. Solvent Orange 54, C.I. Solvent Orange 56, C.I. Solvent Orange 99, C.I. Solvent Brown 42, C.I. Solvent Red 109, C.I. Solvent Red 118, C.I. Solvent Red 119, C.I. Solvent Red 122, C.I. Solvent Red 127, C.I. Solvent Red 160, C.I. Solvent Blue 70, C.I. Solvent Black 27, C.I. Solvent Black 29 and C.I. Solvent Black 35 (12 195/12 197).

The reaction products between ethylene oxide and castor oil are likewise products known per se. They are generally used as surfactants or emulsifiers.

They are commercially available and described for example in K. Lindner, Tenside-Textilhilfsmittel-Waschrohstoffe, Volume 1, page 902, Wissenschaftliche Verlagsgesellschaft mbH, Stuttgart, 1964. A particularly suitable product is commercially available for example under the tradename of Cremophor® EL (BASF Aktiengesellschaft).

Preference is given to using reaction products between from 10 to 40 mol of ethylene oxide and 1 mol of castor oil.

Particular preference is given to the use of a reaction product between 35 mol of ethylene oxide and 1 mol of castor oil.

Since castor oil essentially consists of the glyceride of ricinoleic acid (80–85%) and additionally includes, in minor amounts, the glycerides of oleic acid (7%), linoleic acid (3%), palmitic acid (2%) and stearic acid (1%), the main constituent of the reaction product between ethylene oxide and castor oil is glyceryl polyoxyethylene ricinoleate. Secondary constituents are polyoxyethylene esters of the fatty acids mentioned, polyethylene glycols and glyceryl ethoxylate.

The abovementioned 1 mol of castor oil relates to the number of hydroxyl groups present in the castor oil, which are due to the ricinoleic acid.

Preference is given to dye preparations including from 1 to 30% by weight of dye and from 70 to 99% by weight of reaction product between ethylene oxide and castor oil.

The dye preparations of this invention are advantageously obtainable by dissolving the dyes in the reaction products between ethylene oxide and castor oil at from 30° to 95° C.

They are advantageously useful for coloring granular or pulverulent substrates. They are particularly suitable for coloring fertilizer and seed.

The abovementioned aqueous dye preparations are obtained on addition of water. These aqueous dye preparations, which form a further part of the subject-matter of the present invention, include, in each case based on the total weight of the preparation, from 1 to 50% by weight of the above-defined dye preparation and from 50 to 99% by weight of water.

Preference is given to aqueous dye preparations including from 1 to 40% by weight of the above-defined dye preparation and from 60 to 99% by weight of water.

As mentioned above, the aqueous dye preparations of this invention can be obtained with advantage by mixing the above-defined dye preparations and water in the ratio of this invention.

The novel aqueous dye preparations are advantageously useful for inclusion in waterborne printing inks.

For this purpose, the aqueous dye preparations of this invention can be admixed with the assistants customary for printing inks, such as binders, for example on the basis of polyurethane.

The solvent-free printing inks produced using the aqueous dye preparations of this invention are advantageously useful for coating foil, film and sheet, for example aluminum foil or polyester film/sheet. Aluminum foils for the cigarette industry may be mentioned in particular. The foils thus printed have good performance characteristics.

The Examples which follow illustrate the invention.

EXAMPLE 1

3 g of C.I. Solvent Yellow 82 and 7 g of C.I. Solvent Orange 54 were dissolved at 95° C. in 100 g of a reaction product between 35 mol of ethylene oxide and 1 mol of castor oil. After cooling, the dye preparation was immediately ready to use.

EXAMPLE 2

10 g of C.I. Solvent Red 119 were dissolved at 95° C. in 100 g of a reaction product between 35 mol of ethylene oxide and 1 mol of castor oil. After cooling, the dye preparation was immediately ready to use.

EXAMPLE 3 a) 5 g of the dye preparation described in Example 1 were suspended in 10 g of water. The aqueous dye prepration was immediately ready to use.

b) 15 g of the aqueous dye preparation described under a) were mixed with 90 g of a binder based on a water-soluble polyurethane. The resulting printing ink was drawn down with a knife (12 µm, 24 µm, 36 µm) on aluminum foil. Drying left in each case a gold-printed aluminum foil having good performance characteristics.

EXAMPLE 4

30 g of the dye preparation described in Example 2 were thoroughly mixed at room temperature in a mixer with 100 kg of a fertilizer in granule form. A uniformly red fertilizer was obtained.

EXAMPLE 5 a) 5 g of the dye preparation described in Example 2 were suspended in 20 g of water. The aqueous dye preparation was immediately ready to use.

b) 25 g of the aqueous dye preparation described under a) were mixed with 80 g of a binder based on a water-soluble polyurethane. The resulting printing ink was drawn down with a 36 µm knife on polyester film/sheet. Drying left a red-printed polyester film/sheet having good performance characteristics.

We claim:

1. A non-aqueous dye preparation consisting essentially of, based on the weight of the preparation, from 0.01 to 50% by weight of one or more dyes which have no water-solubilizing groups in the molecule and come from the class of the metal complex azo dyes, and from 50 to 99.99% by weight of a reaction product between from 1 to 50 mol of ethylene oxide and 1 mol of castor oil.

2. A dye preparation as claimed in claim 1 including from 1 to 30% by weight of dye and from 70 to 99% by weight of reaction product between ethylene oxide and castor oil.

3. A dye preparation as claimed in claim 1 including a reaction product between from 10 to 40 mol of ethylene oxide and 1 mol of castor oil.

4. A dye preparation as claimed in claim 1 including one or more chromium complex azo dyes.

5. A dye preparation as claimed in claim 1 including a reaction product between 35 mol of ethylene oxide and 1 mol of castor oil.

6. An aqueous dye preparation consisting essentially of, based on the weight of the preparation, from 1 to 50% by weight of (A) a dye preparation consisting essentially of from 0.01 to 50% by weight of one or more dyes which have no water-solubilizing groups in the molecule and come from the class of the metal complex azo dyes, and from 50 to 99.99% by weight of a reaction product between from 1 to 50 mol of ethylene oxide and 1 mol of castor oil, and (B) from 50 to 99% by weight of water.

7. An aqueous dye preparation as claimed in claim 6 including from 1 to 40% by weight of the dye preparation (A) and from 60 to 99% by weight of water (B).

8. A method of using the dye preparations of claim 1 for coloring granular or pulverulent substrates.

9. A method of using the aqueous dye preparations of claim 6 in printing inks.

* * * * *